Sept. 22, 1931.   J. MILHANDER   1,824,289
PEDAL PAD
Filed Jan. 21, 1930
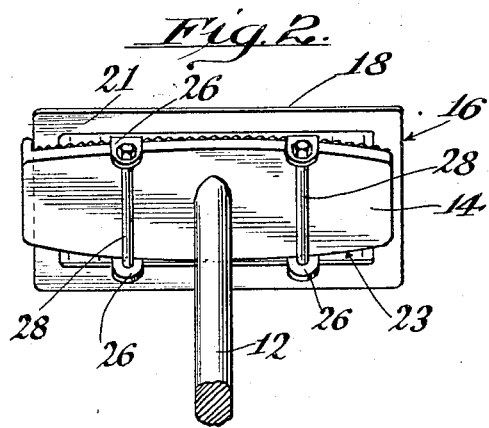
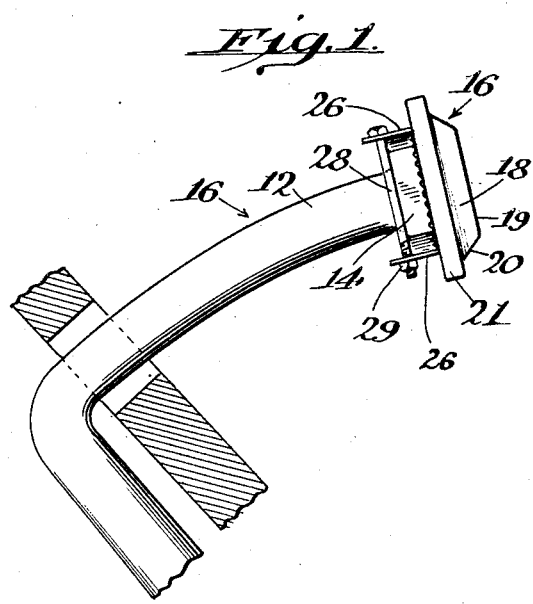
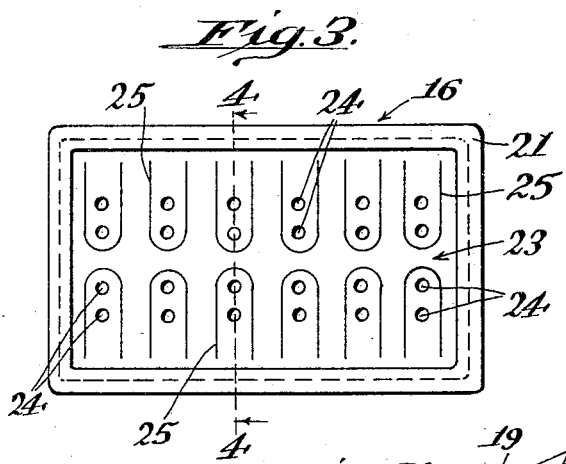
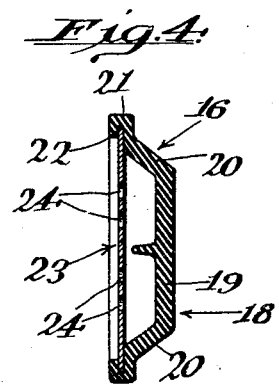
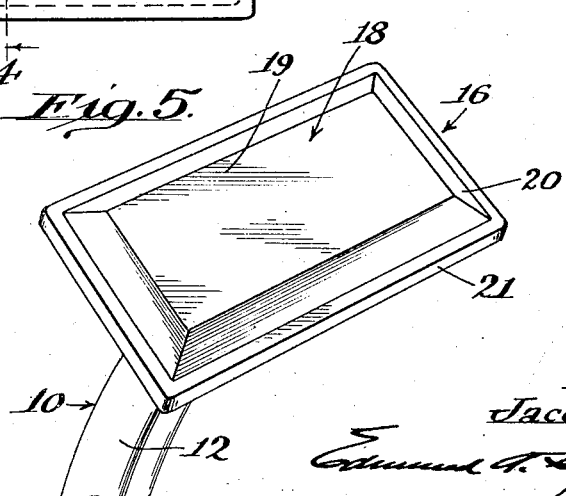
Inventor
Jacob Milhander
Attorney Patented Sept. 22, 1931

1,824,289

UNITED STATES PATENT OFFICE

JACOB MILHANDER, OF LOS ANGELES, CALIFORNIA

PEDAL PAD

Application filed January 21, 1930. Serial No. 422,291.

This invention relates generally to automobile accessories, more particularly to pneumatic cushions for clutch or brake pedals of motor vehicles, and is an improvement over my co-pending application filed in the Patent Office June 10, 1929, bearing Serial No. 369,542.

The object of this invention is to provide a pneumatic cushion for motor vehicle operating pedals constructed in such a manner that it may be easily and quickly connected to such pedals without the employment of special tools or skilled labor.

Another object of this invention is to provide a cushion of the character referred to having adjustable connecting means whereby a single size cushion may be attached to foot rests of various shapes and sizes.

Other objects and advantages will be apparent from the following description, reference being had to the accompanying drawings, in which:

Fig. 1 is a side elevation of a conventional motor vehicle brake or clutch pedal with the improved cushion applied thereto;

Fig. 2 is a sectional view taken on line 2—2 of Fig. 1 in the direction indicated by the arrows;

Fig. 3 is a bottom plan view of the improved pneumatic cushion detached from the pedal;

Fig. 4 is a sectional view taken on line 4—4 of Fig. 3;

Fig. 5 is a perspective view of the improved cushion applied to a pedal.

Referring by numerals to the accompanying drawings, 10 designates a usual motor vehicle operating pedal consisting of an arm 12 having a foot rest 14 upon which is secured the cushion 16.

Cushion 16 consists of a rectangular shaped pad 18 formed of resilient material, such as soft rubber, having a flat top 19, bevelled side walls 20 forming a cavity therebetween, and a plate 23 mounted in a groove 22 formed in a peripheral flange 21.

A plurality of apertures 24 and U-shaped slits 25 are formed in the plate preferably by a single die stamping operation.

The metal within the circumscribed area of the slits form tongues 26 when bent at substantially right angles to the face of the plate. The straps thus formed coact with bolts 28 and nuts 29 to secure the pad to the pedal foot rest.

Attachment of the pad to the foot rest is accomplished as follows:

First; bending the metal to form two pairs of tongues adjacent each end of the plate, this may be easily done with a usual screw driver or other suitable tool.

Second; placing the pad on top of the foot rest.

Third; inserting a pair of bolts into one set of the apertures in the tongues with the bolts engaging the underside of the foot rest.

Fourth; placing a nut on the projecting threaded end of each bolt and tightening same.

From the foregoing it will be seen that the pad may be easily and quickly applied, it being particularly noted that due to the plurality of apertures and slits the pad may be adjusted to various sizes and shapes of foot rests.

During operation of a motor vehicle the pad will act as a shock absorber and prevent slippage of the operator's foot.

I claim:

1. A pedal cushion comprising a pad formed of a resilient material, a metal plate secured to said pad, said plate being slotted to form a plurality of oppositely disposed tongues having bolt openings formed therein, certain of said oppositely disposed tongues being bent outwardly from the plate and engaging the oppositely disposed edges of the pedal foot rest, and bolts passing through the openings in the tongues for securing the pad to the foot rest.

2. A cushion pad for vehicle pedals comprising a pad member formed of resilient material, a metal plate secured to the under face of said pad member, alined rows of metal tongues formed in said plate, the rows being oppositely disposed, the tongues being provided with bolt openings, certain of said tongues being bent outward from said plate and engaging the front and rear edges of the pedal foot rest, and bolts passing through the openings in the tongues to secure the pad to the foot rest.

3. A pedal cushion of the character described comprising a pad formed of resilient material, a metal plate secured to said pad, said plate having a plurality of slits formed therein, the metal within said slits adapted to be bent outwardly to form tongues having a bolt receiving opening in their ends, said tongues being bent over the oppositely disposed sides of a foot pedal, and bolts extending over the rear face of the pedal foot rest to hold the pad in rigid relation thereto.

4. A pedal cushion of the character described comprising in combination with a motor vehicle pedal, a plate engaging the foot rest of said motor vehicle pedal, a pad formed of resilient material having a cavity formed therein secured to said plate, said plate having a plurality of tongues with openings formed therein engaging the oppositely disposed sides of the foot rest of said motor vehicle pedal, and bolts extending through the openings in said tongues and passing over the underside of the foot rest to rigidly secure the pad thereto.

5. A pedal cushion of the character described comprising a pad formed of resilient material having a top, side walls, and a peripheral flange having a groove formed therein, a metal plate mounted in the groove formed in the peripheral flange of said cushion having a plurality of substantially —U— shaped slits formed therein, the metal within the slits forming tongues and having bolt receiving openings therein for connecting the cushion to a motor vehicle pedal when bent outwardly, the openings in said tongues adapted to receive bolts for connecting the cushion to a motor vehicle pedal.

In testimony whereof I affix my signature.

JACOB MILHANDER.